United States Patent
Cioli et al.

(10) Patent No.: US 6,510,151 B1
(45) Date of Patent: *Jan. 21, 2003

(54) PACKET FILTERING IN CONNECTION-BASED SWITCHING NETWORKS

(75) Inventors: Jeffrey Cioli, Derry, NH (US); Jason DiPietro, Weare, NH (US)

(73) Assignee: Enterasys Networks, Inc., Rochester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/716,056

(22) Filed: Sep. 19, 1996

(51) Int. Cl.[7] .............................................. H04L 12/66
(52) U.S. Cl. .................. 370/352; 370/395.31; 370/401; 370/404; 370/230.1
(58) Field of Search ................................. 370/401, 389, 370/402, 403, 404, 405, 406, 412, 428, 429, 229, 230, 231, 235, 456, 902, 463, 252, 360, 254, 911, 408, 225, 355, 381, 351, 388, 352, 395.31, 230.1; 340/825.05, 825.52; 395/200.75, 200.79, 309; 709/226, 239, 249

(56) References Cited

U.S. PATENT DOCUMENTS

| | | | |
|---|---|---|---|
| 4,513,411 A | 4/1985 | Fraser | 370/506 |
| 4,817,080 A | 3/1989 | Soha | 370/252 |
| 5,134,610 A * | 7/1992 | Shand et al. | 370/401 |
| 5,136,580 A * | 8/1992 | Videlock et al. | 370/403 |
| 5,319,633 A | 6/1994 | Geve et al. | 370/254 |
| 5,343,471 A * | 8/1994 | Cassagnol | 370/401 |
| 5,379,291 A * | 1/1995 | Herzberg et al. | 370/404 |
| 5,396,493 A * | 3/1995 | Sugiyama | 370/403 |
| 5,471,399 A | 11/1995 | Tanaka et al. | 370/241 |
| 5,477,547 A * | 12/1995 | Sugiyama | 370/401 |
| 5,481,674 A | 1/1996 | Mahavadi | 395/200.54 |
| 5,485,455 A | 1/1996 | Dobbins et al. | 370/255 |
| 5,490,252 A | 2/1996 | Macera et al. | 395/200.79 |
| 5,491,694 A | 2/1996 | Oliver et al. | 370/455 |
| 5,509,123 A | 4/1996 | Dobbins et al. | 395/200.73 |
| 5,513,171 A | 4/1996 | Ludwiczak et al. | 370/254 |
| 5,515,513 A * | 5/1996 | Metzger et al. | 395/200.79 |
| 5,521,910 A | 5/1996 | Matthews | 370/256 |
| 5,570,366 A * | 10/1996 | Baker et al. | 370/312 |
| 5,627,819 A | 5/1997 | Dev et al. | 370/250 |
| 5,644,571 A * | 7/1997 | Seaman | 370/401 |
| 5,657,314 A * | 8/1997 | McClure et al. | 370/401 |
| 5,675,741 A | 10/1997 | Aggarwal et al. | 395/200.72 |
| 5,684,800 A | 11/1997 | Dobbins et al. | 370/401 |
| 5,691,985 A * | 11/1997 | Lorenz et al. | 370/401 |
| 5,784,373 A * | 7/1998 | Satake et al. | 370/402 |
| 5,790,546 A | 8/1998 | Dobbins et al. | 370/400 |
| 5,835,710 A * | 11/1998 | Nagami et al. | 709/250 |
| 5,857,075 A * | 1/1999 | Chung | 709/223 |
| 5,930,257 A * | 7/1999 | Smith et al. | 370/401 |
| 5,999,531 A * | 12/1999 | Ferolito et al. | 370/390 |
| 6,101,531 A * | 8/2000 | Eggleston et al. | 709/206 |

OTHER PUBLICATIONS

Gard I, et al., International Switching Emposium, "An ATM Switch Implementation–Technique and Technology", vol. 4, 23–27, (May 28–Jun. 1, 1990).

Gard et al., "An ATM Switch Implementation—Technique And Technology," Stockholm, May 28 to Jun. 1, 1990, vol. 4, May 28, 1990, Institute of Electrical And Engineers, pp. 23–27.

* cited by examiner

*Primary Examiner*—Seema S Rao
(74) *Attorney, Agent, or Firm*—Wolf, Greenfield & Sacks, P.C.

(57) ABSTRACT

A method and apparatus are provided for using shared-media networks in a connection-based networking scheme. The method and apparatus may include filtering of packets received by a switch in the shared-media subnetwork. In-line filtering of packets is also disclosed.

24 Claims, 12 Drawing Sheets

PACKET FILTERING IN CONNECTION-BASED SWITCHING NETWORKS

FIELD OF THE INVENTION

This invention relates to communication networks, and, more particularly to apparatus and methods for filtering packets in a connection-based switching network that includes a shared-media subnetwork.

BACKGROUND OF THE INVENTION

As businesses have realized the economic advantages of sharing expensive computer resources, cabling systems (including wireless cabling systems) have proliferated in order to enable the sharing of such resources over a computer network. A network for permitting this communication may be referred to as a local area network or "LAN." LAN refers to an interconnection data network that is usually confined to a moderately-sized geographical area, such as a single office building or a campus area. Larger networks are often referred to as wide area networks or "WANs."

Networks may be formed using a variety of different interconnection elements, such as unshielded twisted pair cables, shielded twisted pair cables, coaxial cable, fiber optic cable or even wireless interconnect elements. The configuration of these cabling elements, and the interfaces for the communication medium, may follow one (or more) of many topologies, such as star, ring or bus. In addition, a number of different protocols for accessing the networking medium have evolved. For example, the Institute of Electrical and Electronics Engineers, IEEE, has developed a number of standards for networks, including IEEE 802.3 relating to Ethernet buses using carrier sense multiple access and collision detection, IEEE 802.4 relating to token buses using token passing and IEEE 802.5 relating to token ring networks using token passing. The American National Standards Institute (ANSI) has also developed a standard for fiber distributed data interface (FDDI) using multiple token passing.

As demand has grown, communication networks have gotten bigger and bigger. Eventually, the number of stations on the network use up the available bandwidth for that network, or approach limits imposed by the physical medium employed. In addition, it is often desirable to combine two existing networks into one larger network. Accordingly, methods and apparatus for connecting two separate networks have developed. One such method involves the use of a bridge.

Generally, a "bridge" refers to a link between (at least) two networks. Thus, when a bridge receives information on one network, it may forward that information to the second network. In this fashion, two separate networks can be made to function as one larger network.

FIG. 1A illustrates one example of networks being interconnected. A first network NW 1 is shown as a network cloud NW1. End station ES1 is located within that network. Similarly, the figure illustrates a second network NW2 containing a second end station ES2; a third network NW3 containing a third end station ES3; and a fourth network NW4 containing a fourth end station ES4.

In FIG. 1A, the four networks NW1, NW2, NW3 and NW4, are interconnected using a shared media network F. (As discussed in more detail below, information on a shared media network is made available to all switches on that network.) The strategy for connecting networks NW1–NW4 in the topology of FIG. 1A uses a "backbone." That is, a separate network is disposed between each of the existing networks NW1–NW4. Communication traffic between the networks, therefore, is sent over the network backbone F. In the illustration, shared media network F is an FDDI token ring. Since shared media network F (or any of networks NW1–NW4) constitutes a communication network within a larger communication network, shared-media network F may also be referred to as a subnetwork.

Interconnections may be achieved using switches S1, S2, S3 and S4. The switch S1 may include two components. The FDDI components F1–F4 process and manage communications over the FDDI ring F, according to methods known in the art. The bridging components B1–B4 manage the bridging of traffic from the networks NW1–NW4 to the FDDI ring F, and vice-versa.

Bridging strategies are well known in the art, and are the subject of a standard promulgated by the IEEE, IEEE 802.1, concerning transparent or self-learning bridges. A useful background discussion of bridges can be found in Radia Perlman, Interconnections: *Bridges and Routers,* Edison Wellesley Professional Computing Series, Reading, Mass. (1992). To aid in understanding the present invention, a discussion of transparent bridges follows. This discussion is not intended to limit the scope or application of the present invention and claims.

One possible strategy for connecting two networks with a bridging board would be for the bridging board to forward all communications (often referred to as "packets" or "data packets"—both of these terms, as used in the specification and the claims, are intended to include traditional data packets and their functional equivalents, such as "cells," "datagrams," or the like) to all other networks connected to that board. For example, whenever a communication is sent from end station ES1, that communication would be forwarded via the shared media subnetwork F to each of the other networks NW2, NW3 and NW4, regardless of who is the intended recipient. In this fashion, the shared-media subnetwork F would serve to combine the four networks NW1–NW4 as though they were only one network. Unfortunately, the duplication of every message sent on the network would quickly clog up the available bandwidth on each of the networks.

To address this problem, it would be possible to program each bridging board with the location of each station on each network. In this way, every communication could be routed to the appropriate network. This is a viable option as discussed below for connection-based networks; however, it may require replacement of existing network hardware, at additional expense.

Another alternative is to have a bridging board watch traffic across the board in order to learn the location of each end station, as communications are made over the network. In this fashion bridges could be simply plugged into networks and left on their own to learn the proper connections to be made. This type of bridge is often referred to as a "transparent" bridge or "self-learning" bridge.

FIG. 1B illustrates an example of end station ES1 sending a packet to end station ES2. Each packet of information includes a unique identifier that indicates the source station and destination station for the packet. In this example, the source address would be a unique address (such as a media access control, or "MAC" address) for ES1 and the destination address is a unique identifier for ES2. In the example, the packet is first sent from network NW1 to the backbone switch S1, as indicated at 12a. From this packet, bridging component B1 learns that end station ES1 is located off of its network port, as indicated in the first two columns of the table illustrated at T1.

A function of the bridging components B1–B4 is to remove (i.e., refuse to forward or "filter") data traffic that should not be sent to an attached network. In the present example, when bridging component B1 determines that end station ES1 lies off of its network port, it should not filter subsequent traffic to network NW1—if that traffic has a destination address corresponding to end station ES1. Accordingly, a filter entry of the table T1 indicates that traffic to end station ES1 should not be filtered.

Because the destination address of the packet (which corresponds to end station ES2) is not present in the table T1, bridging component B1 forwards the packet to the FDDI ring F. As indicated at 12b, the FDDI component F1 forwards the packet along the FDDI ring. Because the bridging component B2 is not aware of where end station ES2 is located, the bridging component B2 forwards the packet onto network NW2, as indicated at 12c. In addition, bridging component B2 learns from the source address for the packet that end station ES1 is located off of the FDDI port. Accordingly, bridging component B2 should filter any future traffic received on the FDDI port and destined to ES1. Thus, bridging component B2 creates a table T2 that identifies end station ES1 as connected off of its FDDI connection (the FDDI port), and indicating in the filter column that future traffic destined to end station ES1 should be filtered from network NW2.

Meanwhile, FDDI component F2 forwards the packet on its FDDI connection, as indicated at 12e. Switches S3 and S4 process the packet in a similar manner as switch S2. As indicated at 12i, the packet is again forwarded to FDDI component F1. Since F1 initiated this packet on the FDDI ring F, FDDI component F1 terminates the packet.

FIG. 1C illustrates what happens when end station, ES3 then sends a packet to end station ES1. The packet is first forwarded from the network NW3 to the switch S3, as indicated at 13a. As before, bridging component B3 learns that end station ES3 is located off its network port. Accordingly, an entry is made in the table T3 indicating that end station ES3 is off of the network port and that communications destined to end station ES3 should not be filtered.

As before, the FDDI component F3 will forward the packet to FDDI component F4. because the destination address for the packet is end station ES1, and there is an entry in the able T4 indicating that packets with a destination address of ES1 should be filtered, this packet filtered at bridging component B4 and not forwarded to network NW4.

FDDI component F4 forwards the packet to FDDI component F1, as indicated at 13c. Bridging component B1 refers to its table T1. End station ES1 is a known destination address and is not a filter entry. Accordingly, the packet is forwarded onto network NW1, as indicated at 13d.

As indicated at 13e, the packet is also forwarded to FDDI component F2. As before, this packet is filtered from network NW2, and bridging component B2 also learns that end station ES3 lies off of its FDDI port—thus, future communications to end station ES3 should also be filtered.

The table located at each switch (es, tables T1–T4) may be implemented as a bridge ASIC filter table or bridge address filter table ("BAF" table). A BAF may be implemented as a separate special-purpose hardware or software mechanism. A purpose of the BAF is to permit automatic filtering of packets. That is, the packet may be automatically filtered (or "in-line" filtered) when received—without intervention of a host CPU or other element implementing the switching functions of the device. The host CPU for the switch may then process more sophisticated procedures or functions while the BAF table and,mechanism in-line filter unwanted packets—preventing these packets from swamping the host CPU. As a result, however, existing hardware and software for a switch may apply filtering based on entries in the BAF table, without providing any opportunity for implementing a more sophisticated filtering scheme on the host CPU.

The network described above employs a destination address-based form of switching. That is, the decision of where to route a packet is based on the destination address for that packet. Most existing network topologies employ destination address-based procedures for determining the flow of communication packets. Accordingly, when a switch receives a packet with a given destination address on a particular port, that switch will always handle the packet in the same manner—filtering the packet or forwarding the packet to the same port, as determined, for example, by the BAF tables or their equivalents.

The network described above also includes a shared media network F. In a shared media network, switches or end stations may be exposed to communication traffic not intended for that switch or end station. For example, a bus, such as a conventional ethernet network, employs a shared media topology. Similarly, a conventional FDDI ring may be viewed as a shared media topology—each station or switch located on the FDDI ring is exposed to all traffic that is present on the ring. As described above, shared media networks also may require some way of filtering packets not intended to cross that switch.

Most currently implemented networks follow a destination address-based scheme and include shared-media networks. An alternative, which is gaining increased acceptance, is to employ connection-based networking.

In a connection-based network, a specific path may be selected through the network for a given data packet. Thus, each packet follows a specific route or "connection" through the network. For example, the packet itself could specify a route through switches on the network. Alternatively, the source address (in combination with the destination address) for a packet could be used to identify a path through the switches. In this case, each source address/destination address pair could be used to uniquely identify a path through the communication network and each switch would know how to handle a packet corresponding to each source address/destination address combination that has a connection passing through that switch. Assignment of the path through the network could be done either through a central management site or through a distributed mechanism for determining a connection path for each source address/destination address pair that corresponds to a communication path that is currently being used.

U.S. Pat. No. 5,485,455 issued Jan. 16, 1996, illustrates a particularly advantageous embodiment of a connection-based network, using a centralized management agent to establish the mapping of destination address/source address pairs to a communication path. U.S. patent application Ser. No. 08/626,596, filed Apr. 2, 1996, which is now U.S. Pat. No. 5,825,772, and commonly owned, discloses a particularly advantageous connection-based networking system employing distributed determination of communication paths through the switched network. Each of the above-identified patents and applications are hereby incorporated by reference in their entirety.

Connection-based networks offer an opportunity to improve network efficiency (i.e., the effective bandwidth of the network) and to provide additional services to network users. Accordingly, many network administrators would like to implement connection-based networking systems. Unfortunately, replacing existing destination-based hardware and software components, including shared-media network infrastructure, in order to implement connection-based network topologies can be an expensive proposition. Accordingly, there is a great need for a method and apparatus utilizing existing destination-based components and shared media networks in a connection-based scheme, preferably in a way that permits efficient filtering of packets in a shared-media subnetwork. Such a method and apparatus could, for example, permit an existing shared media network to be integrated into a newer connection-based networking scheme.

SUMMARY OF THE INVENTION

According to one embodiment of the invention, a method for filtering a plurality of packets received by a switch having a set of known connections is provided. According to this method, information on known connections for the switch is maintained and packets that do not correspond to one of the known connections are filtered.

According to another embodiment of the invention, a method for routing a packet through a connection-based network that includes a shared-media subnetwork is provided. According to the method, the packet is routed through a switch on the shared-media network and filtered on another switch on the shared-media network.

According to another embodiment of the invention, a method of using a switch in a connection-based communication network is provided. According to this embodiment, a path through the network is identified; packets are forwarded according to the identified path; and a packet that does not correspond to the identified path is filtered.

According to another embodiment of the invention, a switch for a connection-based communication network is provided. The switch includes two communication ports, means for maintaining information on a set of known connections, means for forwarding packets corresponding to one of the known connections, and means for filtering packets that do not correspond to one of the known connections.

DETAILED DESCRIPTION

While the preferred embodiment is described in the context of an FDDI subnetwork and filtering using a BAF table, this is not intended to be limiting. Application to other shared media networks and other filtering mechanisms is within the scope of the present invention.

Figure 2:
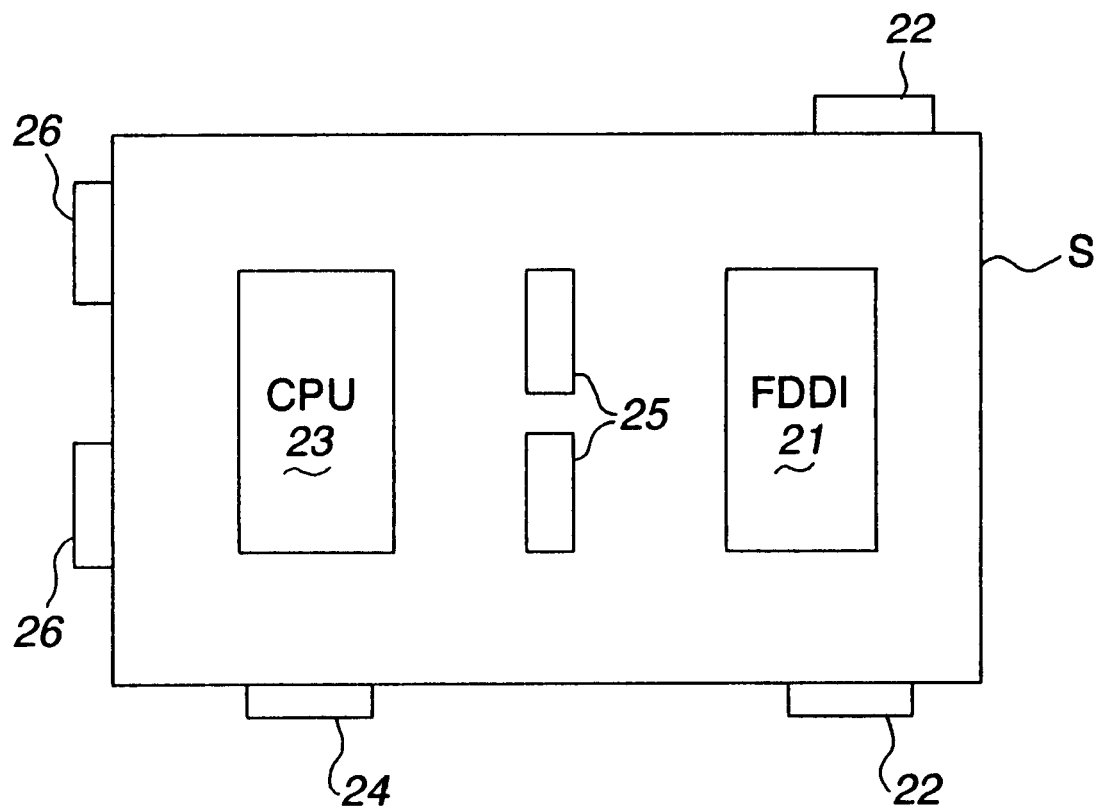
FIG. 2 illustrates an embodiment of a switch for a communication network.

FIG. 2 illustrates one embodiment of a switch S. The switch S includes two communication ports 22 for receiving and sending data on an FDDI token network. An FDDI component 21 is provided to control communication over the FDDI network. Two network ports 26 are also provided. These ports would channel communication to one or two networks coupled to this switching board S. A CPU 23 is provided to control switching and filtering of packets between any network connected via a port 26 and the FDDI network connected via ports 22. A command port 24 is included for downloading commands to control the function of the CPU. Specialized hardware 25 may also be provided. Such hardware could implement the BAF table functions, such as filtering a communication received via the FDDI component 21 from being forwarded to the network attached via one of the ports 26. In one embodiment, specialized BAF hardware 25 filters this communication without requiring the intervention (after an entry has been made in the BAF table) of any software program located on the CPU 23. In this embodiment, the processing of the CPU 23 does not get overloaded by an extremely high volume of communication data on the shared-media FDDI network.

Use of the hardware of FIG. 2 in a connection-based network can be difficult. Use of the BAF hardware is desirable due to its efficiency in filtering unwanted packets and to the fact that it exists in many components of existing systems. It is not readily apparent, however, how BAF hardware for destination address-based networking systems can be used in a connection-based networking system. This is complicated by the fact that the BAF hardware may filter or otherwise process packets received, prior to intervention by the CPU. This complicates the ability to address the problem by downloading connection-based software to the CPU. If a packet is handled exclusively by the BAF hardware, the CPU will not be given an opportunity to process the packet according to a connection-based networking scheme.

According to one embodiment of the invention, the connection-based switching mechanism is resident on the CPU for the applicable switch. This switch may be implemented as disclosed in U.S. Pat. No. 5,485,455 to K. Dobbins, et al. which issued Jan. 16, 1996. U.S. patent application, Ser. No. 08/550,630, entitled "Port-Link Configuration Tracking Method and Apparatus," filed Oct. 31, 1995, now U.S. Pat. No. 5,590,120, discloses particularly advantageous methods and apparatus for determining connections in a connection-based switching network that includes a shared-media subnetwork. This application is hereby incorporated by reference in its entirety.

In one embodiment, a connection-based networking scheme is used that "programs" connections between end stations before communication between those end stations can occur. To program a connection, a path through switches on the network is first identified. That path will define the single communication route to be used between those end stations (of course, in other embodiments, more than one communication route could be selected). Each switch on the identified path is informed (or deduces) that it is on that communication path and which port on that switch should receive packets for forwarding.

Figure 1A:
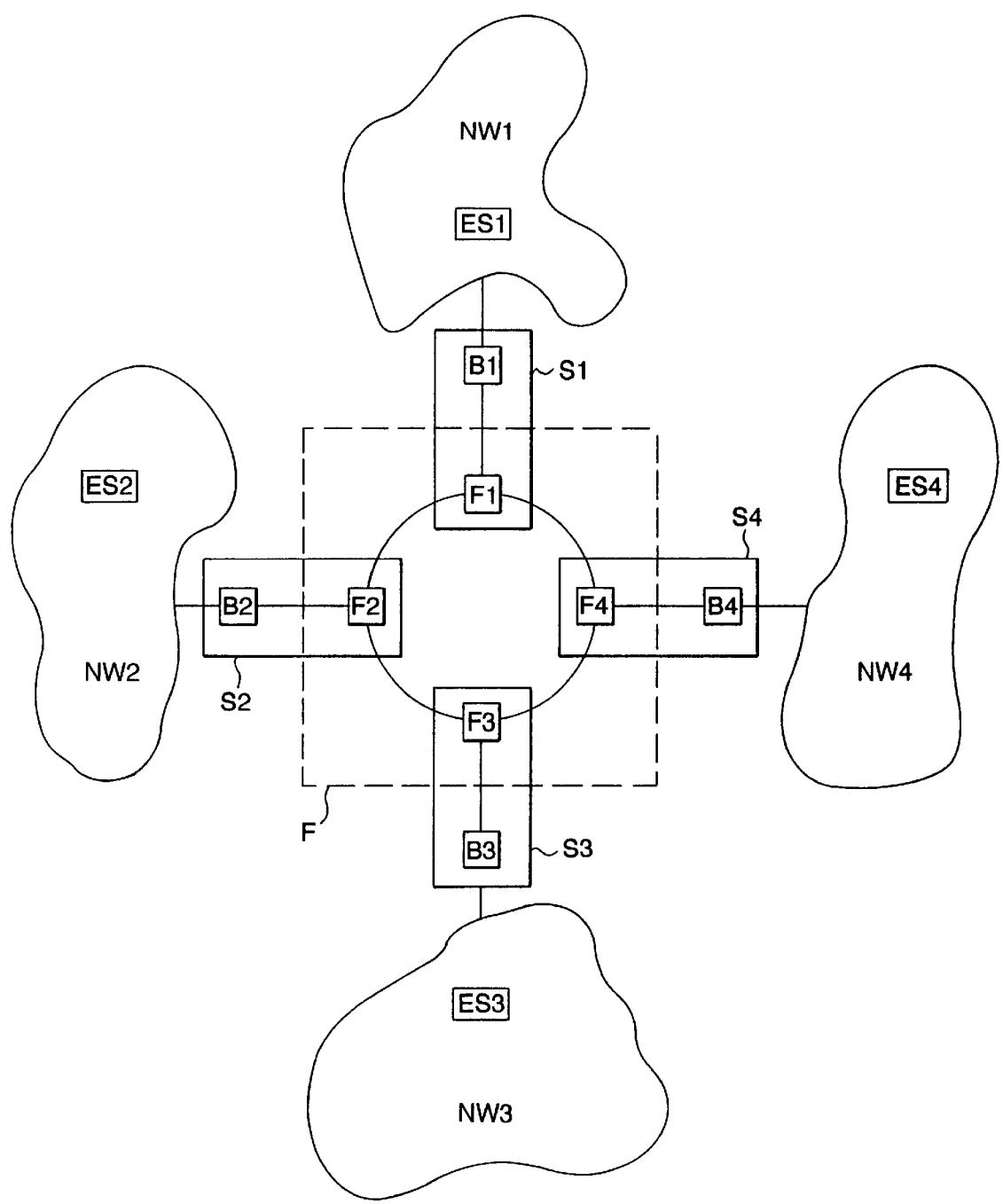
FIG. 1A illustrates a sample communication network.
Figure 1B:
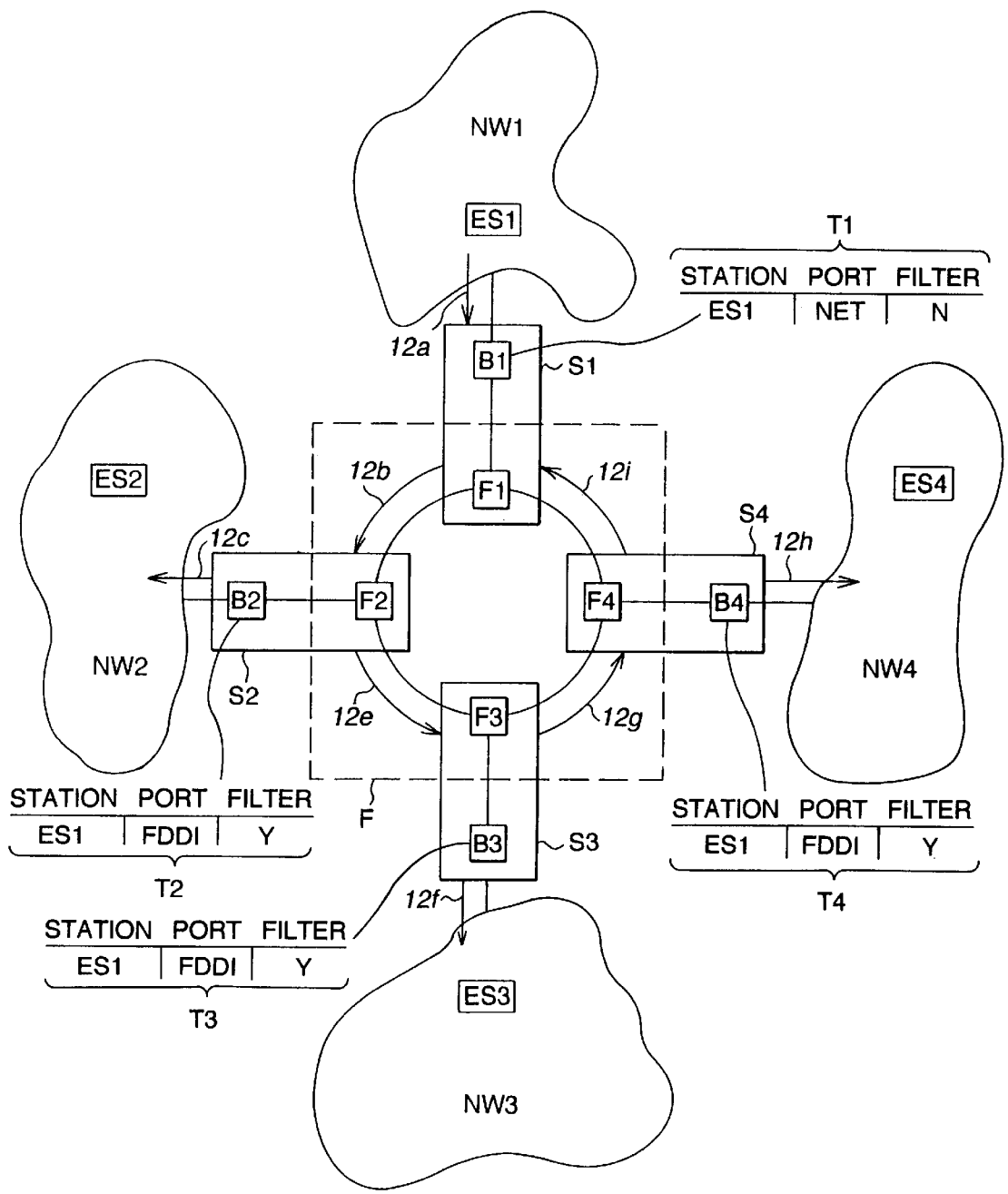
FIG. 1B illustrates an example of a packet being sent from end station ES1 to end station ES2 on the network of FIG. 1A.
Figure 1C:
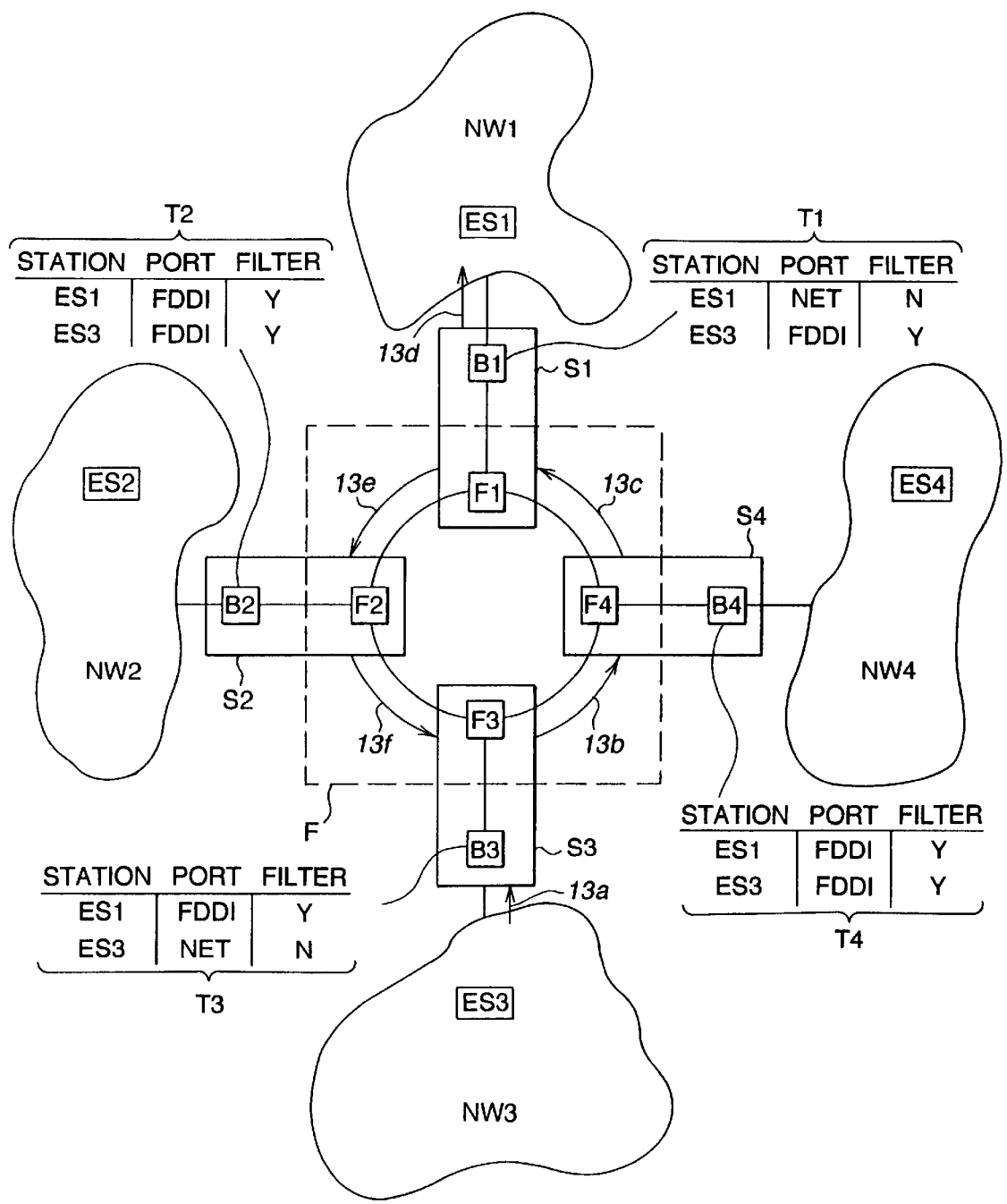
FIG. 1C illustrates an example of a packet being sent from end station ES3 to end station ES1 on the network of FIG. 1B.

Thus, in FIG. 1A, to program a connection between end station ES1 and end station ES2, switch S1 could be programmed to forward ES1/ES2 traffic (that is, packets having a source address corresponding to end station ES1 and a destination address corresponding to end station ES2) to the FDDI component, and ES2/ES1 packets to the network port coupled to network NW1. Similarly, switch S2 would be programmed to forward ES1/ES2 traffic to its network port coupled to network NW2, and ES2/ES1 traffic would be forwarded to the FDDI component.

In the above example, the ES1 /ES2 connection is, therefore "known" to switches S1 and S2, and not "known" to switches S3 and S4. Thus, a connection is "known" if the source address/destination address connection has been programmed through that particular switch. (The present description assumes that known connections are identified by source address and destination address. Use of other identifiers is, of course, feasible and within the scope of the present invention.)

A "known connection table" may be implemented in order to maintain information concerning known connections. A known connection table may be implemented in memory associated with a host CPU 23 of FIG. 2, or by any other equivalent means. The known connection table would, preferably, include an identifier for the forwarding port for each source address/destination address combination corresponding to a known connection.

Thus, an existing network switch in a destination address-based networking scheme may be programmed to perform connection-based switching by downloading alternative software to the CPU for that switch. As explained above, however, this does not resolve how to filter packets in a shared-media subnetwork, or how to retain the advantages of in-line filtering for a shared-media subnetwork.

Figure 3:
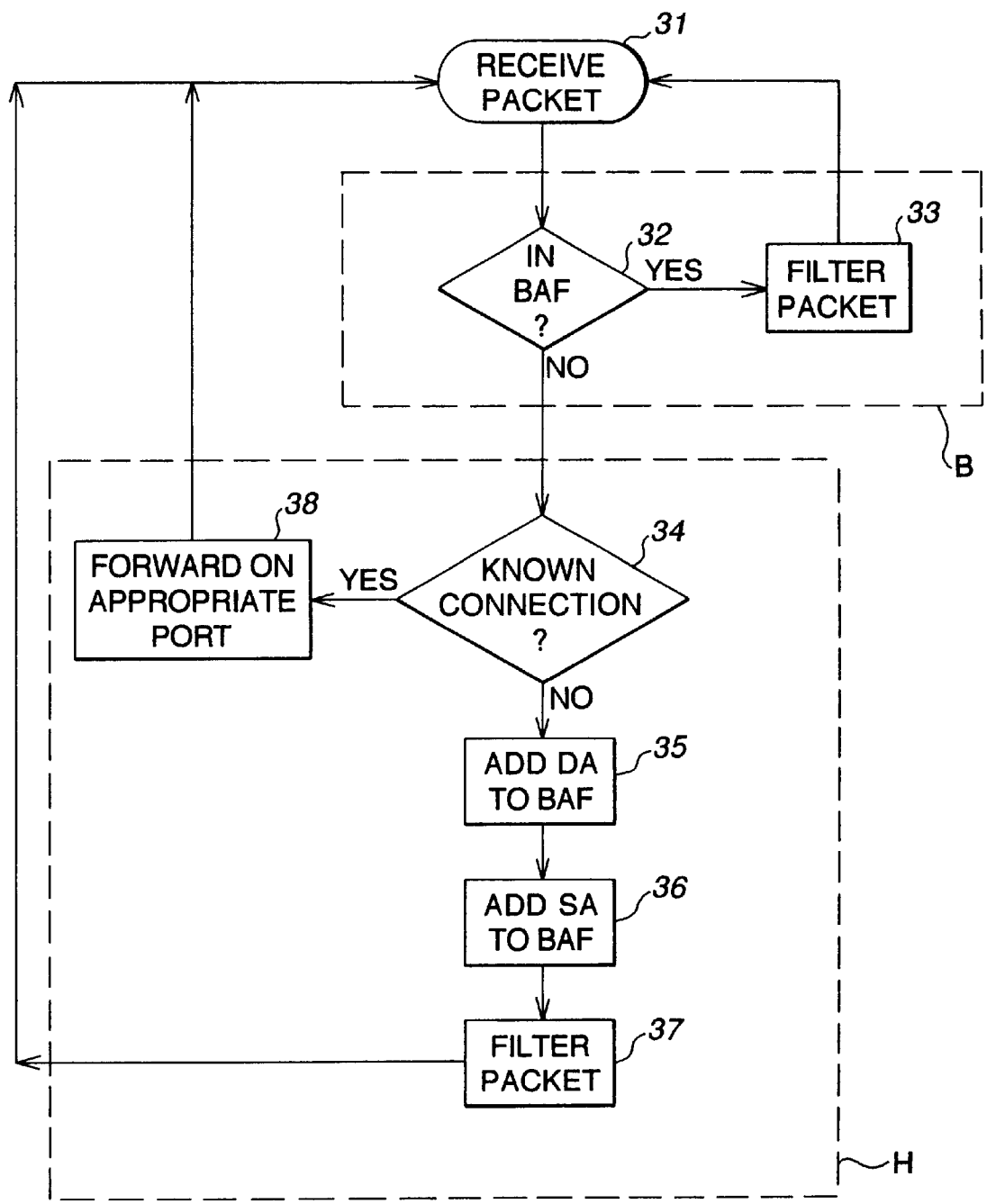
FIG. 3 illustrates one embodiment of a method for filtering packets on a shared-media subnetwork of a connection-based network.

FIG. 3 illustrates one embodiment of a method for implementing connection-based networking on a destination address-based switch. For reasons explained below, this method is useful for networks that do not include redundant communication paths. At a step 31, the applicable switching board receives a packet. At a step 32, it is determined whether the destination address for the packet is resident in the BAF table (with in-line filtering enabled) for this switch. If so, at a step 33, the packet is automatically filtered. As indicated at the box B, these steps may be implemented by the BAF hardware—without intervention from a host CPU. As is apparent from the figure, in this embodiment, the BAF is used only for filtering, and not for forwarding packets. This may be done because, in a connection-based network scheme, the destination address alone is not sufficient information for determining the forwarding port for a switch. Additional information, such as the source address or other routing information, needs to be examined.

If the destination address is not present in the BAF, processing may be resumed by a host CPU, as indicated at the box H. At a step 34, it is first determined whether the applicable packet corresponds to a known, or programmed, connection. That is, does the source address/destination address pair indicate that the communication path for this connection passes through this switching board (the source port may also be used in determining whether a connection is known). If so, at a step 38, the packet is forwarded on the appropriate port, according to a known connection table for the switch. If not, at a step 35, the destination address for that packet is added to the BAF table. At a step 36, the source address is also added to the BAF table. Finally, at a step 37, the packet is filtered.

Thus, steps 35 and 36 assure that all future communications between these two end stations will be filtered by the BAF, and without intervention by the CPU. In a preferred embodiment, entries in the BAF table are removed if no packet has been filtered, based on that entry, over a predetermined period of time.

To program a connection, the source ports are first identified. For example, to program the ES2–ES1 connection in the network of FIG. 1A, switch S1 would identify the FDDI port as the source port for traffic to ES1, and the network NW1 port as the source port for traffic to ES2. After identifying source ports, the corresponding BAF entries are removed. Thus, in the above example, the entry in the BAF table for filtering traffic to ES1 received on the FDDI port is removed (if any) and the entry for filtering traffic to ES2 received on the network NW1 port is removed (if any, for example where another shared media network is used at NW1). (In the preferred embodiment described herein, communication paths or "connections" are established as two-way paths. That is, a packet from end station ES1 to end station ES2 will follow the same path (in reverse order) as a packet from end station ES2 to end station ES1. Of course this is not a requirement in a connection-based network. It would be apparent to one of ordinary skill in the art that the methods and apparatus described herein could be readily adapted to permit programming of one-way communication paths.)

Figure 4:
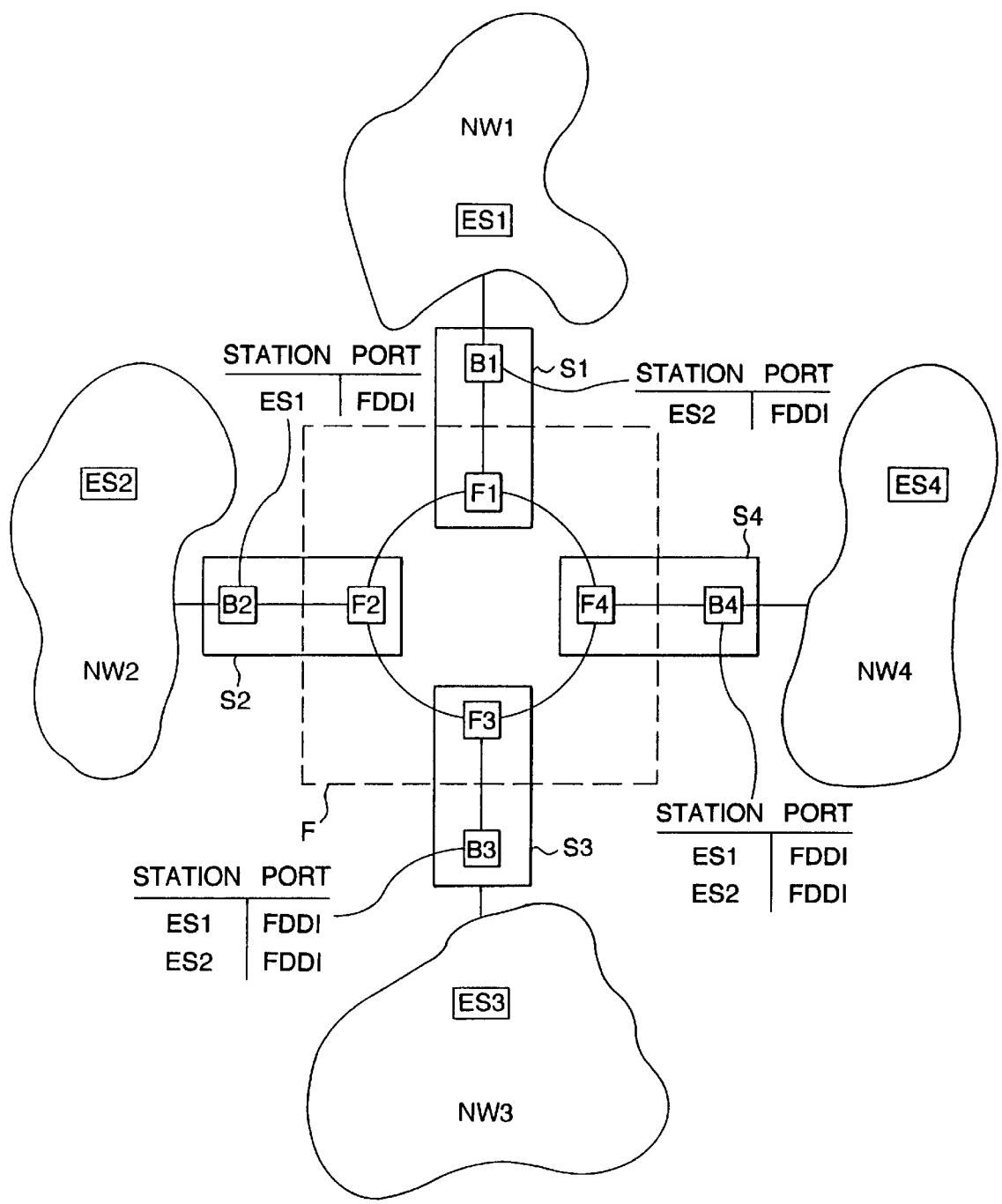
FIG. 4 illustrates an example according to the method of FIG. 3.

FIG. 4 illustrates an example using the network illustrated in FIG. 1A, and after a communication path has been programmed for communication from end station ES1 to end station ES2. As can be seen, each entry in a BAF table corresponds to communications that will be filtered. When packets are sent from ES1 to ES2 and ES2 to ES1, switches S3 and S4 each program both the source address and destination address for the packets into their BAF tables, because these are not known connections. Accordingly, packets to and from ES2 and ES1 are inline filtered at switches S3 and S4. Switch S1 has an entry in its BAF table that would permit filtering of communications to ES2, when received on the FDDI port. When the connection is programmed, end station ES1 is removed from the BAF table for switch S1 and communication received at switch S1 and destined to end station ES1 will be forwarded across switch S1.

The above method works well for communication networks that include no redundant communication paths. That is, a communication for which there is exactly one communication path between any two end stations. Such a network is known in the art as a spanning tree network (including networks with redundant communication paths, but which has redundant paths blocked according to the spanning tree algorithm known in the art). As explained below, however, this method may not be satisfactory when redundant communication paths are present.

Figure 5:
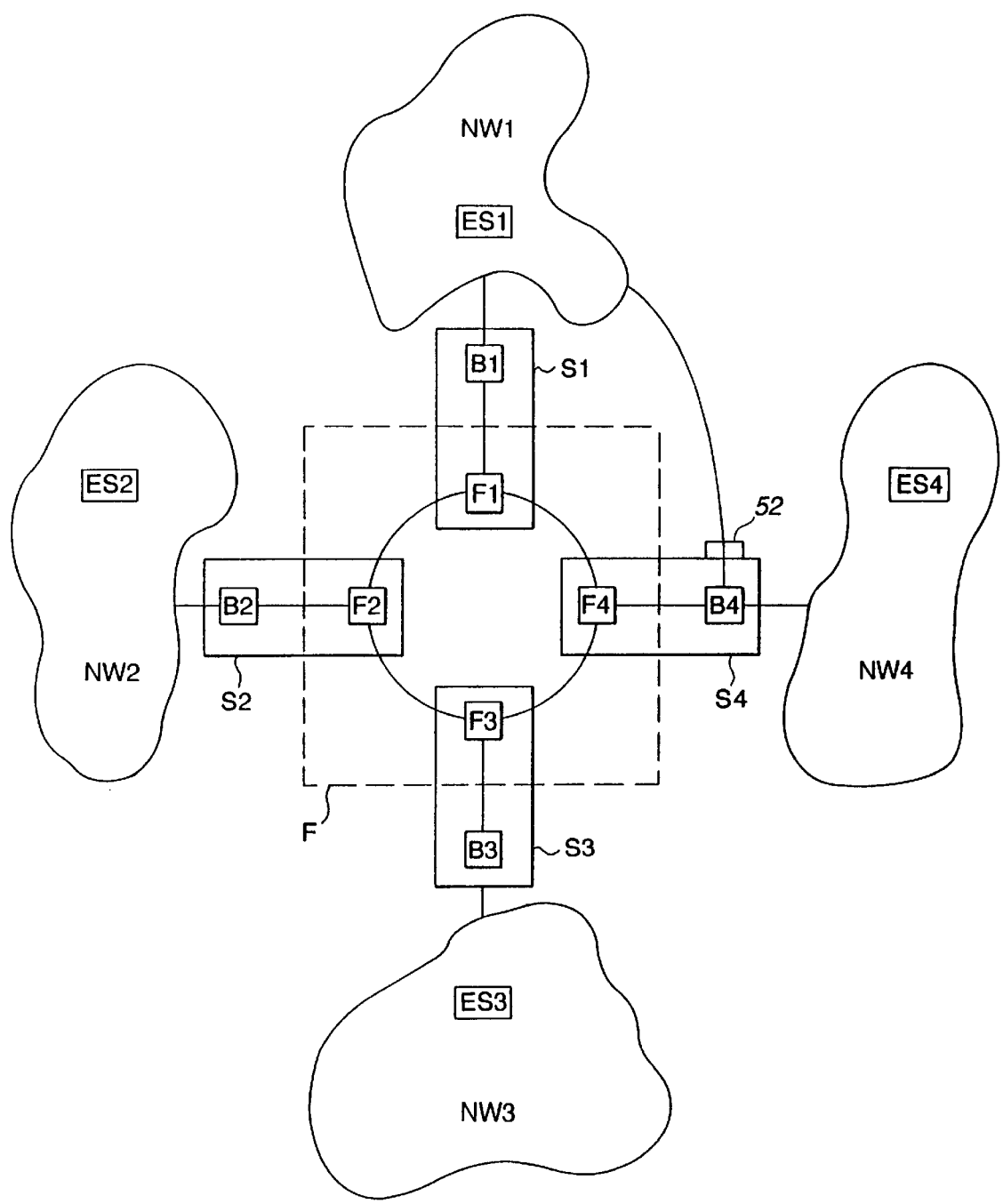
FIG. 5 illustrates a communication network that includes a redundant path.

FIG. 5 illustrates a network where there is a redundant path in the communication network. FIG. 5 illustrates the network of FIG. 1A, with an additional communication link from switch S4, through port 52, and to network NW1.

Consider using the preceding method in the network of FIG. 5, after programming a connection from ES2 to ES1, through switches S2 and S1, followed by programming a connection from end station ES3 to end station ES1 through switches S3 and S4. According to the above method, when end station ES3 sends a packet to end station ES1, switch S1 will be exposed to that packet—which it will determine corresponds to an unknown connection. Accordingly, switch S1 will add the destination address for the packet (ES3) and the source address for the packet (ES1) to the BAF table, as illustrated at FIG. 3, steps 35 and 36. As a result, future packets from ES2 to ES1, which have a connection programmed through switch S1, will be filtered by switch S1—because ES1 appears in switch S1's BAF table.

This problem may be addressed using a port table and a filter connection table. A port table maintains a count of the number of connections through the switch using a particular shared-media source port for sending packets to a particular end station. Thus, the format for a row of the port table would include entries for the port that receives the packet (the source port), the destination address for the packet and a connection count corresponding to the number of different communication paths for that destination address that use that source port.

A filter connection table maintains a list of connection identifiers that should be filtered by the switch, but which are not filtered through the BAF mechanism. The format for a row of the filter connection table would include entries for the source port for the filtered packet, the source address for the filtered packet, and the destination address for the filtered packet. The filter connection table may be implemented separately or as a part of the known connection table. If a packet arrives for which there is an entry in the filter connection table that meets each of those three values, that packet will be filtered.

Figure 6:
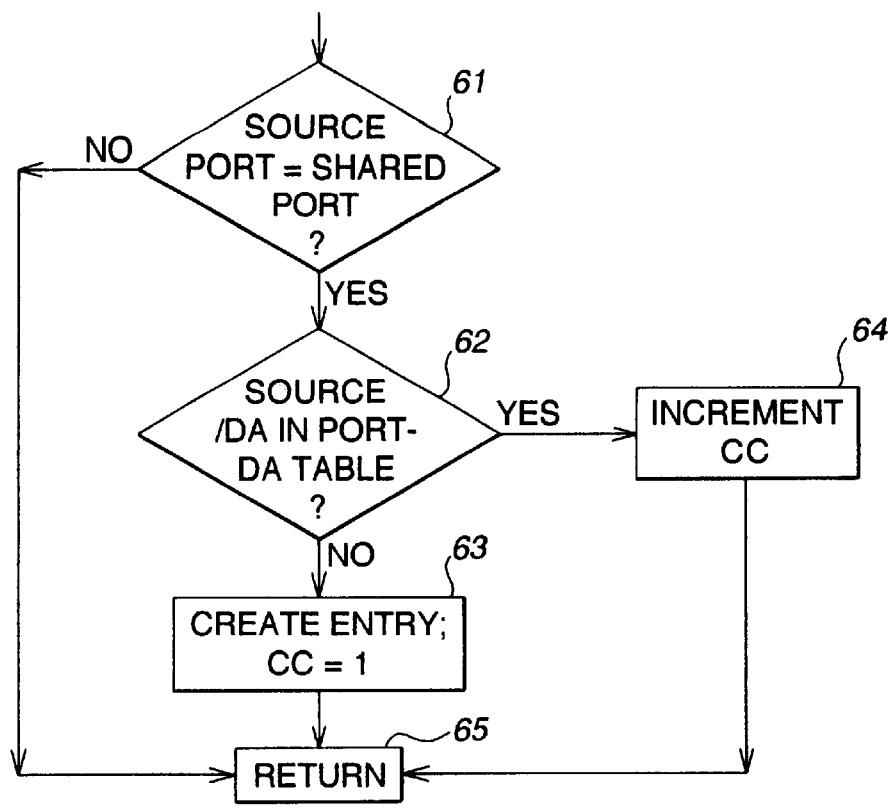
FIG. 6 illustrates one embodiment of a method for programming a connection in a shared-media subnetwork switch, according to the present invention.

FIG. 6 illustrates a method of programming a connection through a switch that uses a port table. At a step 61, it is first determined whether the source port for the connection is a shared media port. (In the disclosed embodiment, it is assumed that one shared-media network is used to connect other connection-based networks. The disclosed method is readily adapted, however, to scenarios where more than one shared-media network is attached to a switch, as would be apparent to one of skill in the art.) If not, no entry needs to be made in the port table. If the source port is a shared-media port, at a step 62, it is determined whether the destination address for the packet is already present in the port table. If so, at a step 64, the connection count for that entry is increased. This indicates that an additional connection is using that port as a source port to transmit to that destination address. If, at step 62, it is determined that the destination address/source port is not in the port table, then, at a step 63, a new row is created for the port table, and a connection count of 1 is assigned. The process then returns (step 63). Any entry in the filter connection table that corresponds to the programmed connection may similarly be removed.

Figure 7:
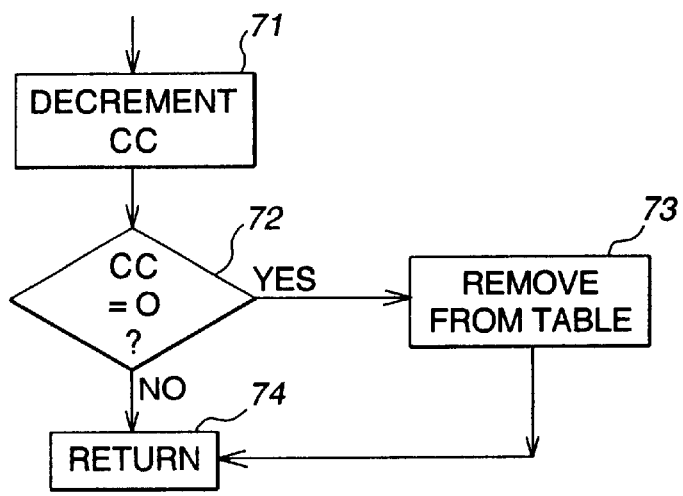
FIG. 7 illustrates one embodiment of a method for unprogramming a connection in a shared-media subnetwork switch, according to the present invention.

FIG. 7 illustrates how a connection can be unprogrammed for a switch. At a step 71, the connection count for the applicable source port/destination address combination is decreased by 1. If the new connection count is determined to be a 0, at a step 72, then that row is removed from the port table, at a step 73. The process then returns (step 74).

Figure 8:
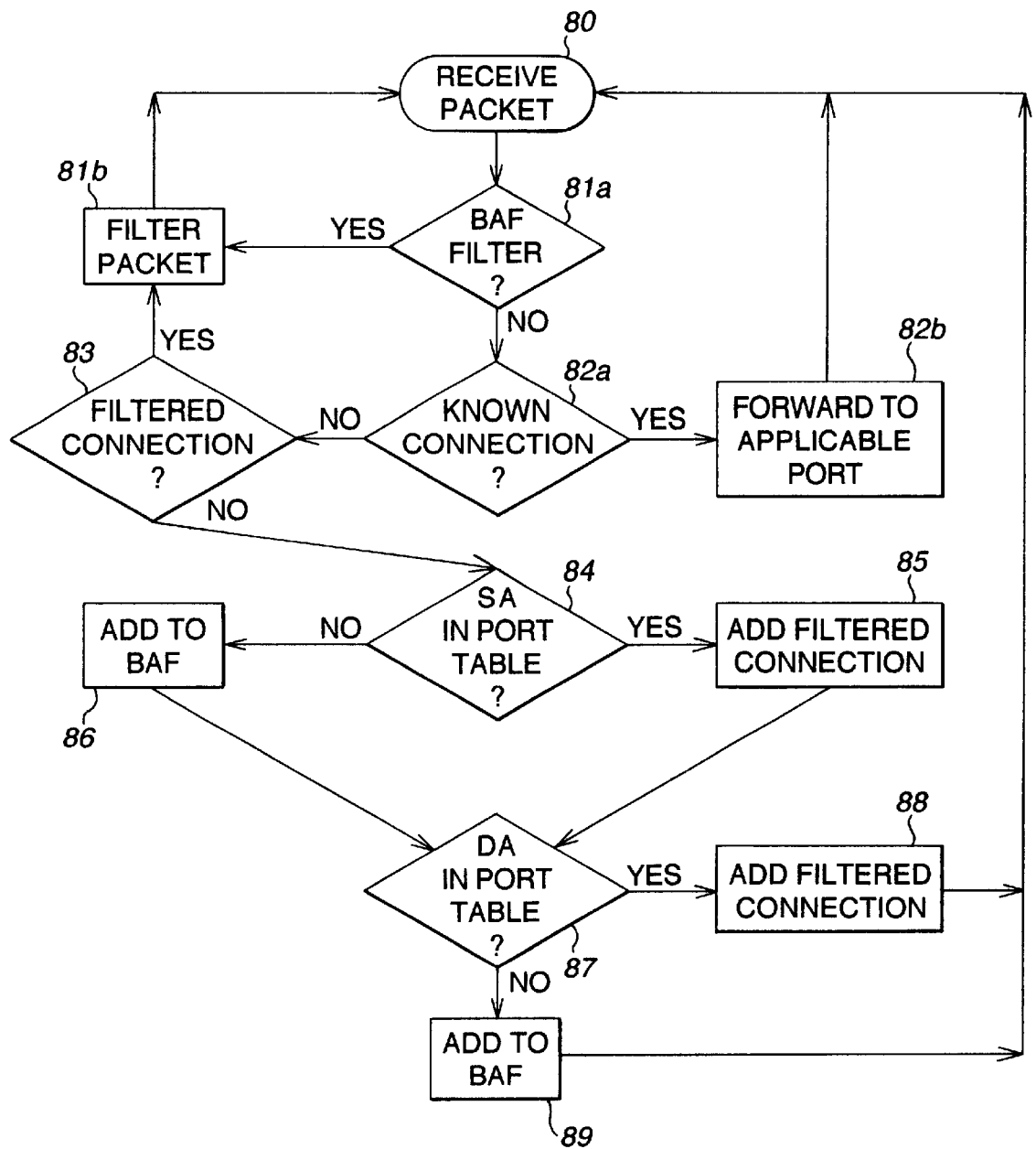
FIG. 8 illustrates one embodiment of a method according to the present invention for receiving and filtering packets on a shared-media subnetwork switch.

FIG. 8 illustrates one embodiment of a method for processing packets at a switch using the port table and filter connection tables described above. The process begins at a step 80 where a packet is received by the applicable switch. At a step 81a, it is determined whether the source port/ destination address combination for the packet meets an entry in the BAF table. If so, at a step 81b, the packet is filtered. These steps may be performed using existing BAF hardware for filtering. The remaining steps in the process, in a preferred embodiment, may be carried out on a host CPU. In this embodiment, the host CPU would then determine, at a step 82a, whether this is a known connection. This step may be performed by examining a known connection table, as described above. If the connection is known, at a step 82b, the packet is forwarded to the applicable port (again, the applicable port may be determined through reference to the known connection table). If the packet does not correspond to a known connection, at a step 83, it is determined whether the packet corresponds to a filtered connection. If there is an entry in the filter connection table corresponding to this packet, the packet may be filtered at a step 81b. (In practice, filtering done in response to an entry in a BAF filter may be performed using a different mechanism than filtering done in response to an entry in the filter connection table; the former may be filtered in BAF hardware while the latter may be filtered by a host CPU.)

If there is no applicable entry in the filter connection table, at a step 84, it is determined whether the source address/ source port combination for the packet appears in the port table. If so, a filtered connection is added to the filter connection table at step 85. The entry, of course, corresponds to the source port, source address and destination address for the packet received at step 80.

If the source address does not appear in the port table, the source address may be added to the BAF, at a step 86.

In addition to examining the source address at steps 84 to 86, steps 87 to 89 perform a similar function for the destination address for the received packet.

In one embodiment, an entry in the filter connection table is removed if no packet corresponding to that entry has been received by the switch over a predetermined amount of time.

As can be seen, this method for receiving packets at a switch S1 assumes that communications between two end stations use the same communication path independent of the direction of the communication. It is readily apparent, however, that the above procedure could be modified to permit different communication paths depending on the direction in which the packet is going.

Figure 9A:
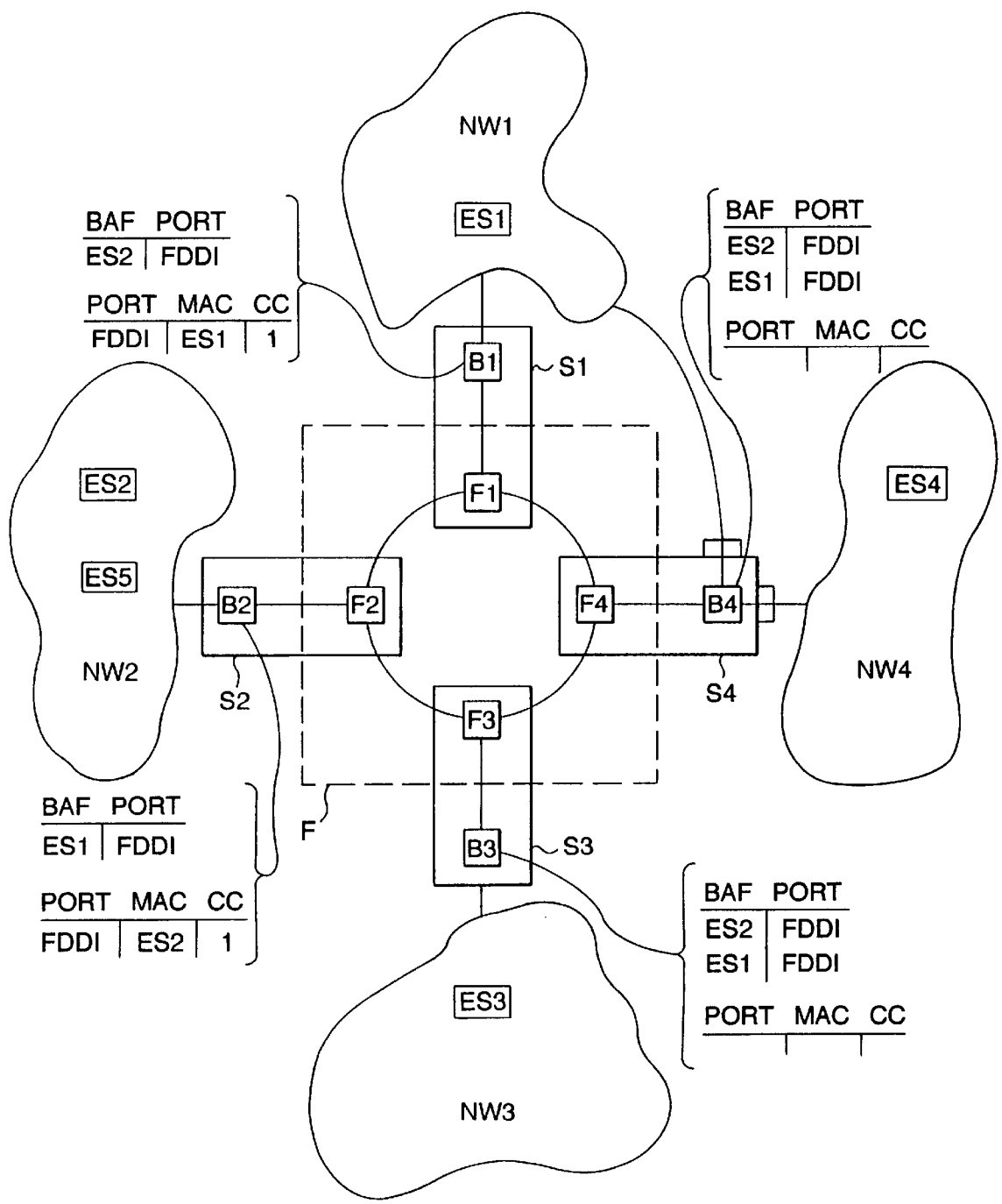
FIG. 9A illustrates an example of forwarding and filtering packets according to the embodiment of the invention shown in FIG. 8.

FIG. 9A illustrates an example of communication in an illustrative network, according to the above embodiment of the present invention. In this figure, a communication path has been programmed from end station ES1 to end station ES2 via switches S1 and S2. After the exchange of ES2–ES1 packets on the network, the BAF table for switch S1 has an entry corresponding to filtering packets sent to end station ES2, when the packet is received via the FDDI port. The port table for switch S1 will include an entry identifying the fact that packets destined to end station ES1 from the FDDI port will be sent—the connection count is now one since one connection (from ES2 to ES1) passes through this port to this end station.

Figure 9B:
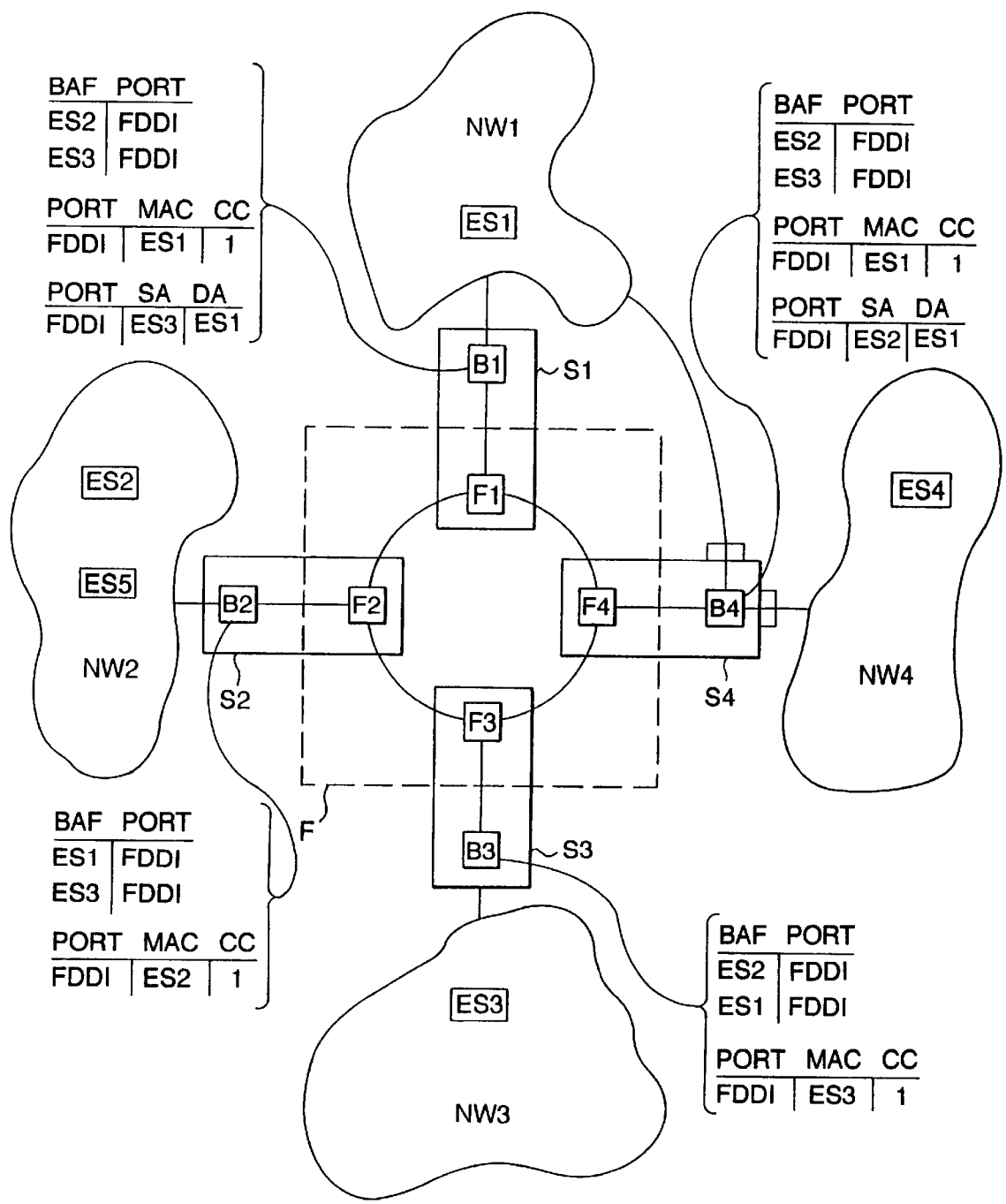
FIG. 9B provides a second example of filtering connections according to the method of FIG. 8.

FIG. 9B illustrates the BAF tables, port tables and filter connection tables for the network of FIG. 9A, after a connection has been programmed from ES1 to ES3 via switches S4 and S3 and packets have been sent on that path. In similar fashion to FIG. 9A, entries in port tables are added at switches S4 and S3, corresponding to the newly programmed connection. According to the method described above, the programming of switch S4 includes both the removal of end station ES1 from the BAF table for switch S4 and the creation of the port table entry at switch S4. The filter connection for switch S4, corresponding to a source port of the FDDI port, a source address of ES2 and a destination address of ES1, would result in the filtering of all future ES2–ES1 traffic, but without resulting in the filtering of future ES3–ES1 traffic.

Figure 9C:
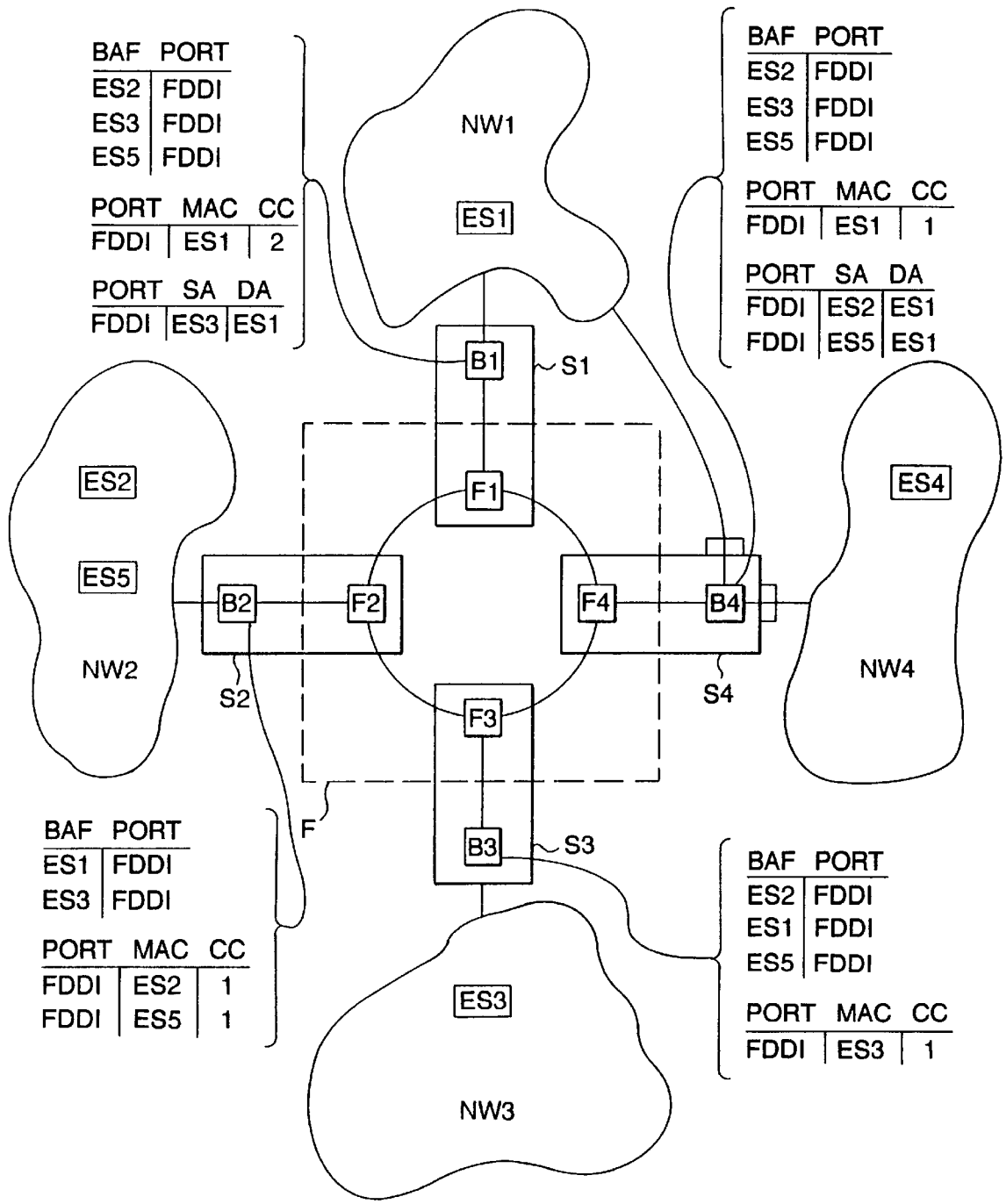
FIG. 9C illustrates a third example of filtering packets according to the method of FIG. 8.

FIG. 9C illustrates what happens when, in the network of FIG. 9B, a connection from end station ES5 to end station ES1 is programmed and ES5–ES1 packets have been sent. As illustrated, the connection count of the port table for switch S1 is increased. This indicates that two connections now use the FDDI port as a source port to send packets having a destination address of ES1.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of filtering a plurality of packets received by a switch having a set of known virtual connections, and the switch further having a fast port coupled to a shared-media subnetwork of a connection-oriented communication network, the set of known virtual connections being programmed through the shared media subnetwork, and a second port, the method comprising the steps of:

storing information on the set of known virtual connections for the connection-oriented communication network for the switch;

forwarding a packet, corresponding to one of the known virtual connections from the first port to the second port, wherein the one of the known virtual connections is programmed through the shared-media subnetwork; and selectively in-line filtering one of the packets, received by the switch on the first port, that does not correspond to one of the set of known virtual connections, wherein the step of selectively in-line filtering comprises the steps of:

maintaining an in-line filter table based on a plurality of destination addresses corresponding to packets to be filtered; and for one of the packets that does not correspond to one of the known connections, adding an entry to the in-line filter table corresponding to a destination address for that packet.

2. The method of claim 1, wherein the step of selectively in-line filtering further comprises the step of:

adding an entry to the in-line filter table corresponding to a source address for a received packet that does not correspond to one of the known connections.

3. The method of claim 1, further comprising the step of:

selectively filtering one of the packets based on which port that packet was received by the switch, a destination address for that packet and a source address for that packet.

4. The method of claim 1, wherein the shared-media subnetwork comprises an FDDI token ring network.

5. A method of filtering a plurality of packets received by a switch having a set of known virtual connections, and the switch further having a first port coupled to a shared media subnetwork of a connection-oriented communication network, the set of known virtual connections being programmed through the shared media subnetwork, and a second port, the method comprising the steps of:

storing information on the set of known virtual connections for the connection-oriented communication network for the switch;

forwarding a packet, corresponding to one of the known virtual connections from the first port to the second port, wherein the one of the known virtual connections is programed through the shared-media subnetwork;

selectively in-line filtering one of the packets, received by the switch on the first port, that does not correspond to one of the set of known virtual connections; and maintaining, for at least one destination address that has a known connection through the switch using the first port as a source port, a count of the number of connections for that destination address which the flirt port as a source port.

6. The method of claim 5, wherein the step of selectively in-line filtering comprises the steps of:

maintaining an in-line filter table based on a plurality of destination addresses corresponding to packets to be filtered; and for one of the packets that does not correspond to one of the known connections, adding an entry to the in-line filter table corresponding to a destination address for the received packet, if the destination address for the received packet does not have a connection count of more than zero.

7. The method of claim 6, further comprising the steps of:

maintaining a filter connection table that includes entries designating packets to be filtered;

for one of the packets that is received on the first port and does not correspond to one of the known connections, adding an entry to the filter connection table corresponding to that packet, if a destination address for that packet has a connection count using the first port of more than zero; and filtering any packet received by the switch that has a corresponding entry in the filter connection table.

8. A switch for a connection-oriented communication network, the switch being coupled to a shared-media subnetwork, comprising:

a first port;

a second port;

means for storing information on a set of known connection-oriented virtual connections for the switch;

means, coupled to the first port, the second port and the means for storing, for forwarding a first packet corresponding to one of the known virtual connections from the first port to the second port, wherein the one of the known virtual connections is programmed through the shared-media subnetwork; and means, coupled to the first port and the second port, for in-line filtering a packet received on the first port, when the packet does not correspond to one of the known virtual connections, wherein the means for selectively in-line filtering comprises:

means for maintaining an inline filter table based on destination addresses of a plurality of packets to be filtered;

means for adding an entry to the in-line filter table corresponding to the destination address of a received packet that does not correspond to one of the known connections.

9. The switch of claim 8, wherein the means for filtering further comprises:

means, coupled to the first port, for selectively filtering one of the packets based on the port on which that packet was received by the switch, the destination address for that packet and the source address for that packet.

10. The switch of claim 8, further comprising an FDDI component, coupled to the first port, to manage communication over an FDDI token ring's network.

11. The switch of claim 8, wherein the means for selectively in-line filtering further comprises:

means for adding an entry to the in-line filter table corresponding to the source address for the received packet.

12. A switch for a connection-oriented communication network, the switch being coupled to a shared-media subnetwork, comprising:

a first port;

a second port;

means for storing information on a set of known connection-oriented virtual connections for the switch;

means, coupled to the first port, the second port and the means for storing, for forwarding a first packet corresponding to one of the known virtual connections from the first port to the second port, wherein the one of the known virtual connections is programmed through the shared-media subnetwork;

means, coupled to the first port and the second port, for in-line filtering a packet received on the first port, when the packet does not correspond to one of the known virtual connections; and means for maintaining, for each destination address of the known connections that uses the first port as a source port, a count of the number of known connections for that destination address which use the first port as a source port.

13. The switch of claim 12, wherein the means for selectively in-line filtering comprises:

means for maintaining an in-line filter table based on the destination addresses of the packets to be filtered; and means for adding an entry to the in-line filter table corresponding to a destination address of a packet received by the switch and not corresponding to one of the known connections, if the destination address for the packet does not have a connection count of more than zero.

14. The switch of claim 13, further comprising:

means for maintaining a filter connection table that includes entries designating packets to be filtered;

means for adding an entry to the filter connection table that corresponds to a packet received by the switch and not corresponding to one of the known connections, if the destination address for the packet has a connection count of more than zero; and means for filtering any packet received having a corresponding entry in the filter connection table.

15. A method of programming a virtual connection for a packet in a connection-oriented network, the connection passing through a shared media subnetwork that includes a switch, the virtual connection passing from a source port of the switch through a destination port of the switch, the source port being coupled to the shared media subnetwork of the connection-oriented network, the method comprising the step of:

programming a virtual connection through the connection-oriented communication network, the virtual connection passing through the shared-media subnetwork, the programming step including a step of disabling filtering of the packet when it is received on the source port of the switch.

16. The method of claim 15, wherein: step of disabling comprises the step of disabling in-line filtering of the packet when it is received on the source port of the switch.

17. The method of claim 16, wherein:

the packet is sent from a first end station to a second end station, the second end station having a destination address; and the step of disabling comprises the step of removing an entry corresponding to the destination address and source port from an in-line filter table for the switch.

18. The method of claim 15, wherein:

the step of disabling comprises the step of removing an entry corresponding to the connection being programed from a filter connection table for the switch.

19. A method of using a switch, having a first port and a second port, in a connection-oriented communication network for forwarding a plurality of packets, one of the packets being sent from a first end station on the connection-oriented network to a second end station on the network, the method comprising the steps of:

identifying a virtual path through the network for one of the packets to be transmitted through the network from the first end station to the second end station, the identified virtual path passing through a shared media subnetwork that includes the switch;

forwarding the one of the packets, being sent from the first end station to the second end station, from the first port of the switch to the second port of the switch, according to the identified virtual path; and selectively filtering one of the packets, received by the switch, that is not being transmitted from the first end station to the second end station defined by the virtual path.

20. The method of claim 19, wherein the first port is on a shared-media subnetwork and the step of selectively filtering includes the step of selectively filtering one of the packets received by the switch on its first port.

21. The method of claim 20, wherein the step of filtering comprises the step of:

selectively in-line filtering one of the packets.

22. The method of claim 21, wherein the step of selectively in-line filtering includes the step of selectively in-line filtering one of the plurality of packets, based on the port on which that packet was received by the switch and a destination address for the packet.

23. The method of claim 22, further comprising the step of:

selectively filtering one of the packets based on the port on which that packet was received by the switch, the destination address for that packet and the source address for that packet.

24. The method of claim 22, wherein the shared-media subnetwork includes an FDDI token ring network.

* * * * *

UNITED STATES PATENT AND TRADEMARK OFFICE
CERTIFICATE OF CORRECTION

PATENT NO.  : 6,510,151 B1
DATED       : January 21, 2003
INVENTOR(S) : Jeffrey Cioli and Jason DiPietro It is certified that error appears in the above-identified patent and that said Letters Patent is hereby corrected as shown below:

Column 11,
Line 29, should read:
-- switch further having a first port coupled to a shared-media --

Column 12,
Line 1, should read:
-- switch further having a first port coupled to a shared-media --
Lines 20-21, should read:
-- nections for that destination address which use the first port --
Line 63, should read:
-- means for maintaining an in-line filter table based --

Column 13,
Line 12, should read:
-- cation over an FDDI token ring subnetwork --

Column 14,
Line 11, should read:
-- The method of claim 15, wherein:
    the step of disabling --

Signed and Sealed this

Twenty-seventh Day of May, 2003

JAMES E. ROGAN
*Director of the United States Patent and Trademark Office*